United States Patent
Nye et al.

[11] Patent Number: 5,912,442
[45] Date of Patent: Jun. 15, 1999

[54] STRUCTURE HAVING LOW ACOUSTICALLY-INDUCED VIBRATION RESPONSE

[75] Inventors: Theodore W. Nye, Palos Verdes Estates; Jeffrey L. Baker, Huntington Beach, both of Calif.

[73] Assignee: TRW Inc., Redondo Beach, Calif.

[21] Appl. No.: 08/887,500

[22] Filed: Jul. 2, 1997

[51] Int. Cl.$^6$ .................................................. E04B 1/82
[52] U.S. Cl. ........................................ 181/292; 181/286
[58] Field of Search .................................. 181/284, 286, 181/288, 290, 292, 293, 294, 295

[56] References Cited

U.S. PATENT DOCUMENTS

| | | | |
|---|---|---|---|
| 2,850,109 | 9/1958 | Benjamin | 181/295 |
| 3,910,374 | 10/1975 | Holehouse . | |
| 4,084,366 | 4/1978 | Saylor | 181/292 |
| 4,235,303 | 11/1980 | Dhoore et al. . | |
| 4,284,457 | 8/1981 | Stonier et al. . | |
| 4,291,080 | 9/1981 | Ely et al. . | |
| 4,318,453 | 3/1982 | Rose et al. | 181/292 |
| 4,379,191 | 4/1983 | Beggs et al. . | |
| 4,410,065 | 10/1983 | Harvey | 181/292 |
| 4,433,751 | 2/1984 | Bonneau . | |
| 4,475,624 | 10/1984 | Bourland, Jr. et al. . | |
| 4,509,616 | 4/1985 | Blecherman . | |
| 4,671,841 | 6/1987 | Stephens . | |
| 4,759,513 | 7/1988 | Birbragher . | |
| 4,816,097 | 3/1989 | Williams et al. . | |
| 5,041,323 | 8/1991 | Rose et al. . | |
| 5,175,401 | 12/1992 | Arcas et al. . | |
| 5,246,520 | 9/1993 | Scanlon et al. . | |
| 5,268,055 | 12/1993 | Bales et al. . | |
| 5,445,861 | 8/1995 | Newton et al. . | |
| 5,498,127 | 3/1996 | Kraft et al. . | |

*Primary Examiner*—Khanh Dang
*Attorney, Agent, or Firm*—Michael S. Yatsko

[57] ABSTRACT

A low vibroacoustic structure 10 according to the present invention comprises a first facesheet 12 defining a plurality of first holes 22, a second facesheet 16 defining a plurality of second holes 36, and a core 14. The first and second facesheets are attached to opposed surfaces of the core. The core defines a plurality of passages 32 in communication with the first and second holes to form channels 38 through the structure. The core is typically a honeycomb sheet. The first and second facesheets and the core are formed of lightweight materials such as lightweight metals, metal matrix composites, or polymer matrix composites. The perforated structure reduces structural acoustic coupling and acoustically induced vibration. The structure can be formed as a panel. The panel can be attached to support structures exposed to high-energy acoustic environments to reduce acoustically induced vibration of the structures.

25 Claims, 8 Drawing Sheets

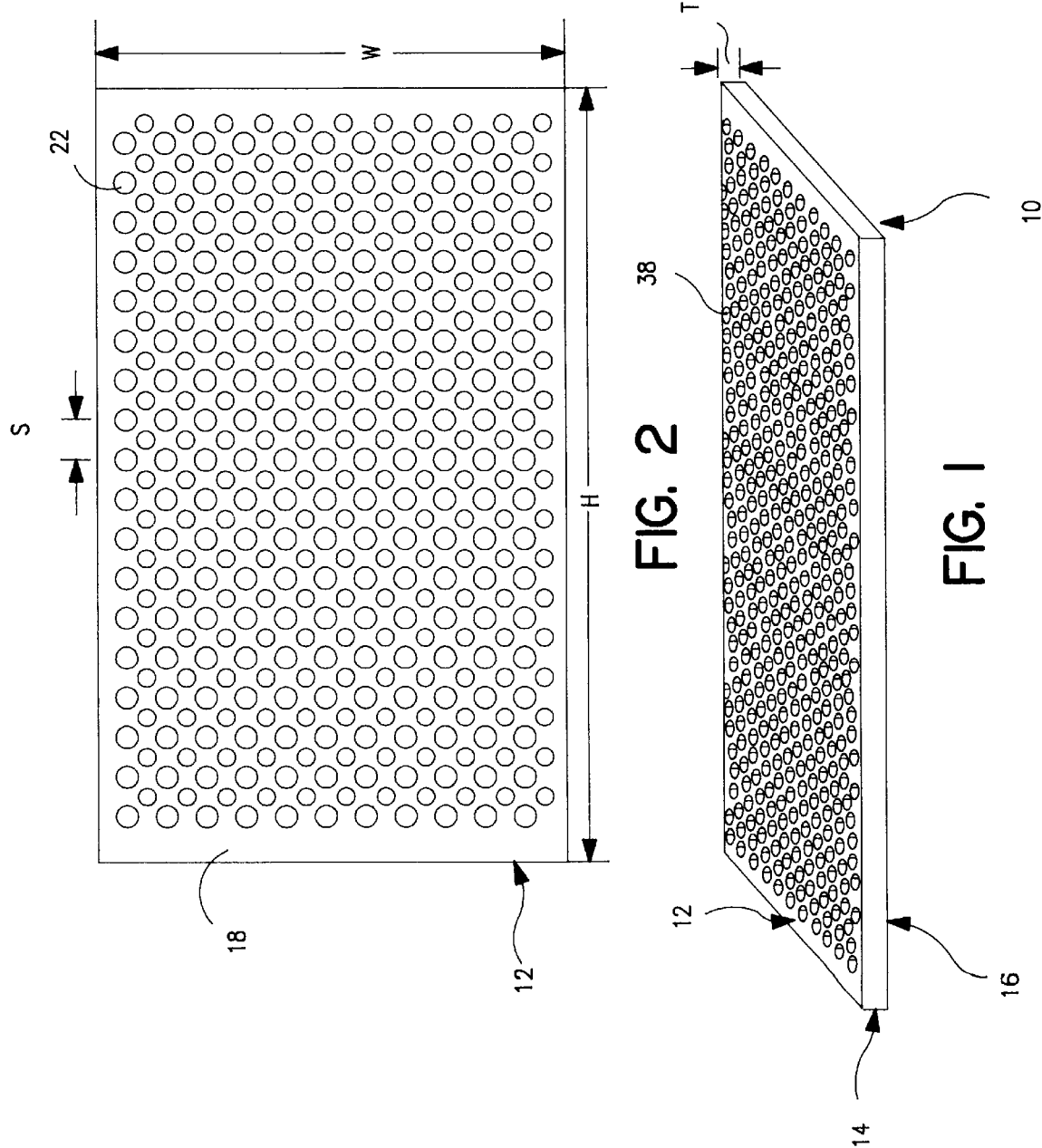

STRUCTURE HAVING LOW ACOUSTICALLY-INDUCED VIBRATION RESPONSE

BACKGROUND

The invention is directed to the field of vibroacoustics and, more particularly, to a structure for use in high-energy acoustic environments having low acoustically-induced vibration characteristics.

Spacecrafts such as satellites are placed in orbit using a dedicated launch vehicle. Spacecraft vibroacoustic environments and associated loads result from the launch vehicle rocket engines supersonic flow and the shearing of adjacent air. The acoustic energy significant to structural components is normally mostly within the frequency range of about 30–500 Hz. The apparent sound and reflections of this sound generally reach a peak level just at lift-off and then decay gradually as the launch vehicle increases speed and gains altitude. The initial engine noise is reverberated throughout the launch facility and is ultimately transmitted through the launch vehicle fairing where it impinges onto the spacecraft.

To reduce the level of acoustic energy to which the spacecraft is subjected, launch vehicles include a shroud which surrounds the spacecraft, protects against obvious wind loads, and absorbs some acoustic energy. Shrouds do not, however, provide sufficient acoustic protection of the payload. Measures are used to supplement the shroud and increase the acoustic protection of the spacecraft, including adding sound absorptive materials to the shroud. Although these materials add some acoustic protection, they also add undesirable weight to the launch vehicle and reduce lift capability.

The payload is mounted to the spacecraft bus. Honeycomb panels including imperforate graphite or aluminum facesheets on a honeycomb sheet core are commonly placed on or comprise the bus. Acoustic energy that impinges on the panels is reflected, absorbed or transmitted through the panels. The absorbed energy results in panel vibrational excitation. The transmission loss through a panel is related to the sound energy loss between an inlet face and an outlet face due to reflection or absorption. Known honeycomb panels exhibit this transmission loss and can be designed to maximize sound absorption so as to reduce noise.

Vibroacoustics are important for honeycomb panels that have appreciable surface area and are lightly loaded. Such panels are susceptible to acoustic excitation during liftoff, due to their high stiffness, low weight, low damping and high acoustic coupling factors. In general, panels with composite facesheets respond at higher levels than panels with facesheets of aluminum. The response of a panel is highly affected by its distributed mass loading. Lightly loaded panels have a much higher response than panels with loads equal to multiples of mass per square foot. Composite panels also exhibit less damping than aluminum panels due to bonded joints versus bolted joints, for example, which relates to their higher response. Because of weight constraints, spacecraft now utilize increasing numbers of composite parts in place of heavier metallic parts, oftentimes reducing the bus structural weight by as much as 20–30%.

For electronic assemblies that attach to equipment compartment panels, it is important to reduce vibrational exposure as much as possible. This is because electronic failures are most often linked to mechanical vibrations that produce failure conditions due to overstress or fatigue of the electronic components. Spacecraft equipment is specified to withstand vibrations in the 20–2000 Hz bandwidth, but is most susceptible to vibrations in the low frequency range of about 200–300 Hz. Rarely are the vibroacoustic levels high enough to actually damage the structural hardware such as the panels, but rather the electronic equipment are the weak link in the overall design. Acoustics drive the panels and cause vibration and significant additional acceleration of the electronics. The risk of electronics failure is greatest for a several second period during liftoff.

Known vibroacoustic reduction methods involve adding mass to the panels in the form of more structure, or using energy absorbing or dissipating devices. Adding mass or absorbing/dissipating devices achieves vibroacoustic reduction, but it also significantly increases the cost of launching the spacecraft associated with the added mass, and therefore is less than totally satisfactory.

Thus, there is a need for a panel structure for use in high-energy acoustic environments such as in spacecrafts that (I) allows reduced acoustic energy absorption and reduced acoustically induced structural vibration excitation of the structure and components to which the structure is attached; and (ii) is lightweight.

SUMMARY

The present invention provides an improved structure that satisfies the above-described needs. Particularly, the present invention provides a low vibroacoustic structure for use in high-energy acoustic environments. The structure is typically in the form of a multilayer panel comprising a first facesheet including a first inlet face, a first outlet face, and a plurality of first holes extending through the first facesheet between the first inlet face and the first outlet face. A second facesheet includes a second inlet face, a second outlet face, and a plurality of second holes extending through the second facesheet between the second inlet face and the second outlet face. A core having an inlet surface and an outlet surface is disposed between the first and second facesheets. The first facesheet faces the inlet surface of the core and the second facesheet faces the outlet surface. The core defines a plurality of passages extending between the inlet and outlet surfaces. The core is typically a honeycomb sheet, including a plurality of cells directed substantially perpendicular to the first and second facesheets.

The holes of the first and second facesheets are preferably in substantially aligned communication with the passages of the core to form continuous channels through the panel. The channels reduce acoustically induced vibration of the panel.

The first and second facesheets can be comprised of a lightweight metal, a metal matrix composite or a polymer matrix composite.

The honeycomb sheet is typically comprised of a lightweight metal.

The low vibroacoustic structure according to the present invention (I) has reduced acoustically-induced vibration characteristics over the frequency range of from about 20 Hz to about 500 Hz; and (ii) is lightweight, making it ideally suitable for use in applications having strict weight constraints. The panel construction is particularly suitable for spacecraft applications. The panel can be used in a spacecraft structure such as a spacecraft bus to provide acoustic protection and reduce acoustically-induced vibration of the spacecraft bus, and any payload attached to the bus, during launch of the spacecraft. A typical use of the panel in the spacecraft bus is an equipment compartment panel.

The low vibroacoustic structure can also be used in other spacecraft applications in which vibration is a concern such as antenna reflectors.

DRAWINGS

These and other features, aspects and advantages of the present invention will become better understood from the following description, appended claims and accompanying drawings, where:

FIG. 1 is a perspective view of a low vibroacoustic structure according to the present invention;

FIG. 2 is a top plan view of a perforated facesheet of the structure of FIG. 1;

DESCRIPTION

Figure 3:
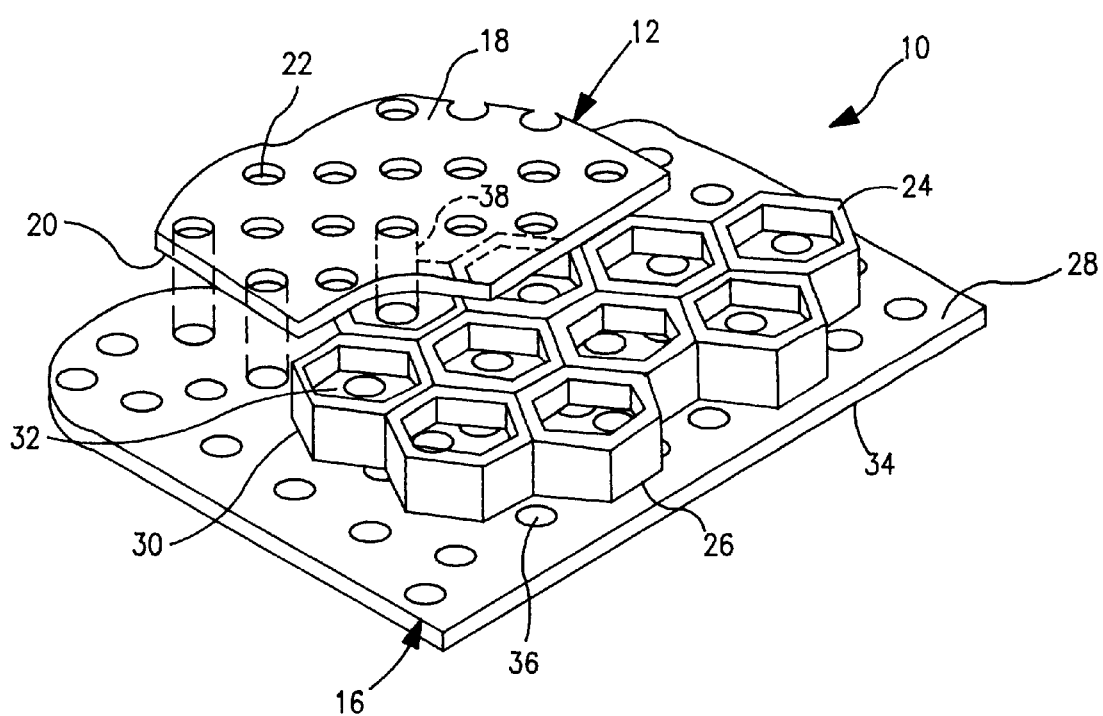
FIG. 3 is a partially broken away, enlarged, perspective view of the low vibroacoustic structure of FIG. 1.

A low vibroacoustic structure according to the present invention is illustrated in FIGS. 1–3. The illustrated low vibroacoustic structure is in the form of a panel 10 comprising a first facesheet 12, a core 14 and a second facesheet 16. The structure can be provided in other forms as described below.

Referring to FIG. 3, the first facesheet 12 comprises an inlet face 18 and an outlet face 20. The faces 18, 20 are typically flat. A plurality of first holes 22 are formed through the first facesheet 12 between the inlet face 18 and the outlet face 20. The facesheet has a height, H, a width, W, and a thickness, T. The dimensions of the panel can be varied depending on the application of the panel.

The first holes 22 are typically circular shaped. The holes 22 can alternately have other non-circular shapes. The holes 22 typically have a diameter of from about 0.001 in. to about 0.125 in., and an on-center hole spacing, S, of from about 0.007 in. to about 0.5 in. The holes 22 can be arranged in a staggered pattern as shown, or alternately in other patterns such as aligned rows and columns (not shown). The holes 22 can have a total cross-sectional area of from about 8% to about 51% of the area of the inlet face 18 of the first facesheet 12. Increasing this percentage reduces the weight of the panel 10, but reduces the panel bending strength. In general, increasing the hole size reduces the panel bending strength as larger holes act as stress raisers in the panel. The size, spacing and area percentage of the holes 22 can be varied depending on performance considerations including acoustic response as described below, and panel stiffness and bending strength.

The first facesheet 12 typically has a thickness of from about 0.025 in. to about 0.125 in.

As described below, the panel 10 can be used in a spacecraft bus as an equipment compartment panel. The mass loading on the panels 10 from electronic equipment such as sensors, antennae, data measuring instruments and the like is typically about 3–4 lb/ft$^2$.

The core 14 has opposed surfaces to which the first and second facesheets 12, 16 are attached. As illustrated in FIG. 3, the core 14 is typically a honeycomb sheet having an inlet face 24 in abutting contact with the outlet face 20 of the first facesheet 12, and an outlet face 26 in abutting contact with a second inlet face 28 of the second facesheet 16. The honeycomb sheet form of the core 14 includes a plurality of cells 30 defining passages 32 directed substantially perpendicular to the first facesheet 12 and the second facesheet 16. The cells 30 are typically hexagonal shaped and typically have a diameter of about 0.125 in. The cells 30 can alternately have other polygonal shapes or be circular. The thickness of the core 14 is typically from about 0.625 in. to about 1.25 in. The cell 30 diameter and the core 14 thickness can be varied depending on strength and stiffness requirements of the panel 10.

The second facesheet 16 comprises the second inlet face 28, a second outlet face 34, and a plurality of second holes 36 extending through the second facesheet 16 between the second inlet face 28 and the second outlet face 34. The first holes 22, the passages 32 and the second holes 36, define channels 38 through the panel 10.

The first facesheet 12 and the second facesheet 16 can be comprised of a suitable lightweight metal, metal matrix composite, or polymer matrix composite material. Suitable metals include aluminum, titanium and magnesium.

Suitable metal matrix composite materials can include aluminum, titanium and magnesium matrices, and silicon fibers, titanium carbide and titanium boride fibers.

Suitable polymer matrix composite materials include fiber reinforced plastic composite materials which comprise thermosetting or thermoplastic matrices, and various compositions of embedded fibers. For example, the matrix can comprise epoxy-based and polycyanate-based resin systems. Epoxy graphite composite comprised of an epoxy resin matrix and graphite fibers is extremely lightweight, and provides high lateral stiffness. Epoxy graphite composite also has a low coefficient of thermal expansion for high thermal dimensional stability, making it advantageous for mounting to high-precision instruments. A suitable epoxy graphite perforated composite material is commercially available from Aztex of Waltham, Mass.

Continuous fiber polymer matrix composites provide superior strength and stiffness to weight ratios as compared to aluminum facesheets. For composite sheets having a small hole diameter such as about 0.025 in., composite fibers can be loosely woven around the holes without causing fiber breakage and reduced sheet strength.

Other fiber materials having properties similar to graphite fibers such as "KEVLAR" and glass fibers can optionally be used in the facesheets 12, 16.

The core 14 is typically formed of aluminum. The density of aluminum honeycomb sheet is about 3.1–3.3 lb/ft$^3$. Optionally, suitable lightweight metallic and non-metallic materials such as formed plastics can be used to construct the core 14.

The first facesheet 12 and the second facesheet 16 can be attached to the core 14 using a suitable adhesive. For example, the adhesive can be FM 964 adhesive available from 3M Corporation of St. Paul, Minn.

The first and second facesheets 12, 16 can each have a layered structure comprised of multiple thin layers, and with the holes in the different layers being in alignment with each other (not shown).

The panel 10 provides important advantages in regard to reducing acoustically-induced vibration. The flat, perforated structure of the panel 10 does not efficiently couple to external sound pressure as compared to conventional, non-perforated acoustic panels, regardless of sound phase and sound direction. Reduced structural acoustic coupling results in less vibrational energy being created by the panel 10. Opposite phase pressure differentials on each side of the panel are significantly reduced because the holes formed in the first and second facesheets 12, 16 and the core 14 form through channels, allowing pressure to readily travel through the panel. Reduced pressure differentials result in the panel being driven less by the sound.

The following non-limiting examples illustrate advantages of the present invention.

EAMPLES

Panels according to the present invention with perforated facesheets on opposed sides of a honeycomb core were fabricated and tested for responsiveness to white noise acoustic excitation. The panel facesheets were fabricated from sheet aluminum, 0.025 in. thick, and holes of various sizes and spacings were formed through the thickness of the sheets. Both facesheets for each panel had identical hole sizes and hole spacings. Referring to FIG. 2, overall panel dimensions were 35 in. height, 43 in. width and 0.75 in. thickness. The honeycomb core was comprised of aluminum, with a 0.125 in. cell diameter, 0.0007 in. wall thickness, and an equivalent core density of 3.1 lb./ft$^3$.

TABLE 1 below gives the hole characteristics for the facesheets of the panels. Panel 1 comprised solid facesheets with no holes. Panels 2–4 had a hole spacing of 0.25 in., and different hole diameters, numbers of holes/in.$^2$, and percentages of hole total area to facial area of the facesheets. Panels 5 and 6 had a hole spacing of 0.5 in., and the different hole characteristics listed.

TABLE 1

| Panel | Hole Diameter (in.) | Hole Spacing (in.) | Holes/in.$^2$ | Hole Total Area/Panel Facial Area (%) |
|---|---|---|---|---|
| 1 | — | — | — | 0 |
| 2 | 0.08 | 0.25 | 24 | 11.5 |
| 3 | 0.09 | 0.25 | 32 | 22 |
| 4 | 0.19 | 0.25 | 18.5 | 51 |
| 5 | 0.19 | 0.5 | 4.6 | 12.6 |
| 6 | 0.25 | 0.5 | 5 | 23 |

Figure 4:
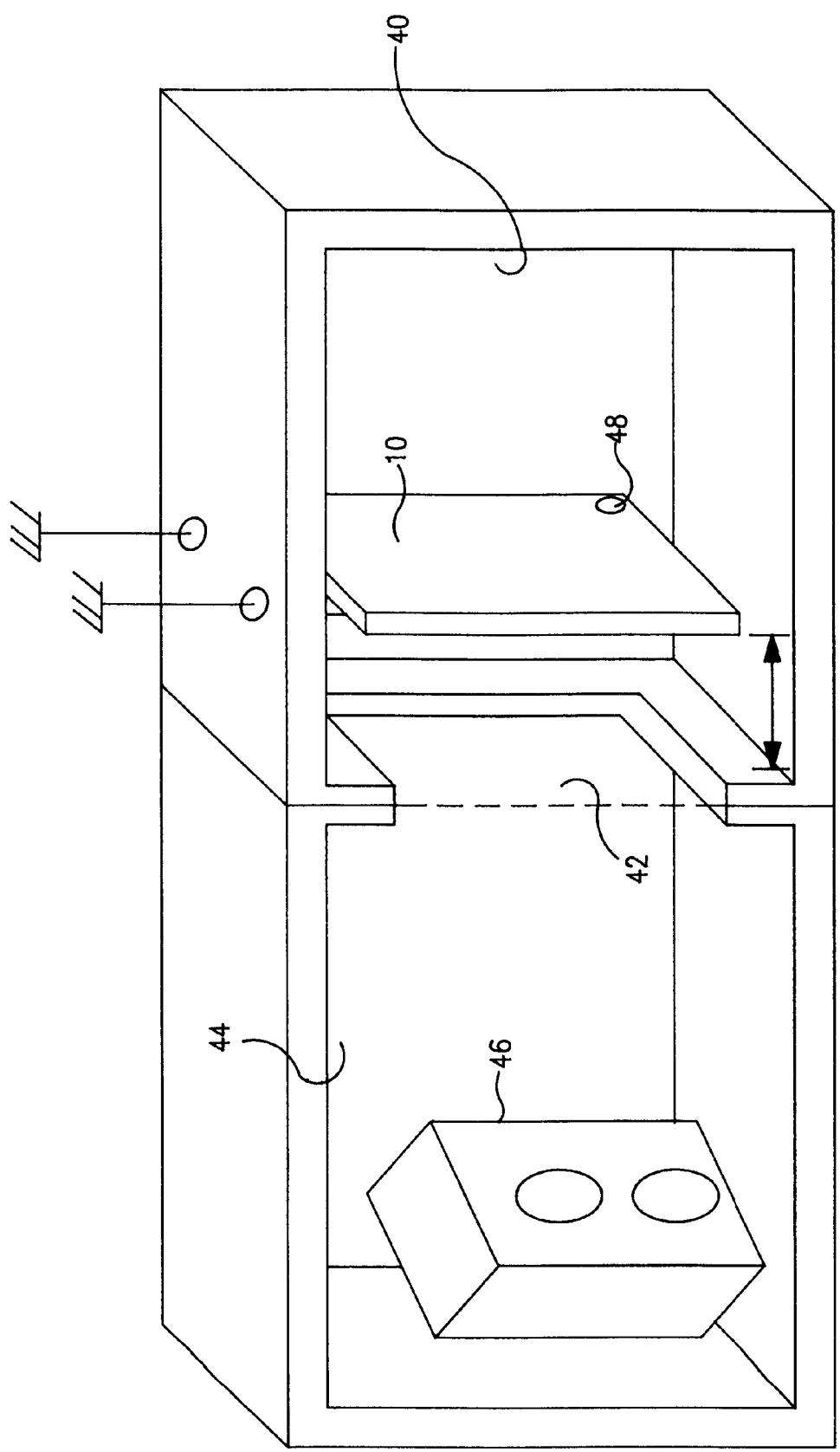
FIG. 4 illustrates an acoustic test chamber used for testing the response of the low vibroacoustic structure to noise.

Referring to FIG. 4, the panels 10 were suspended individually in a four foot on each side acoustic anechoic chamber 40, approximately one foot from a window 42, which lead to a noise source reverberant chamber 44. The panels were freely suspended in this manner to avoid boundary conditions associated with fixed attachment of the panels to the test structure. In the reverberant chamber 44, a 400 watt speaker 46 provided the acoustic excitation of the panel. An input microphone (not (shown) was located approximately 6 in. from the panel, to measure the panel near field sound pressure levels. An accelerometer 48 was positioned in a lower corner of the panels 10 to record the panel response to the acoustic excitation. Any corner of the panels allowed nearly all the vibration modes below 500 Hz to be observed.

Each panel was tested at average white noise sound pressure levels (SPL) ranging from about 66 dB SPL to about 92 dB SPL. Random vibration power spectral density (PSD) responses were recorded on a Hewlett Packard spectrum analyzer (Model No. 3563A) and are for each panel at 91 dB SPL in FIG. 5.

Figure 5:
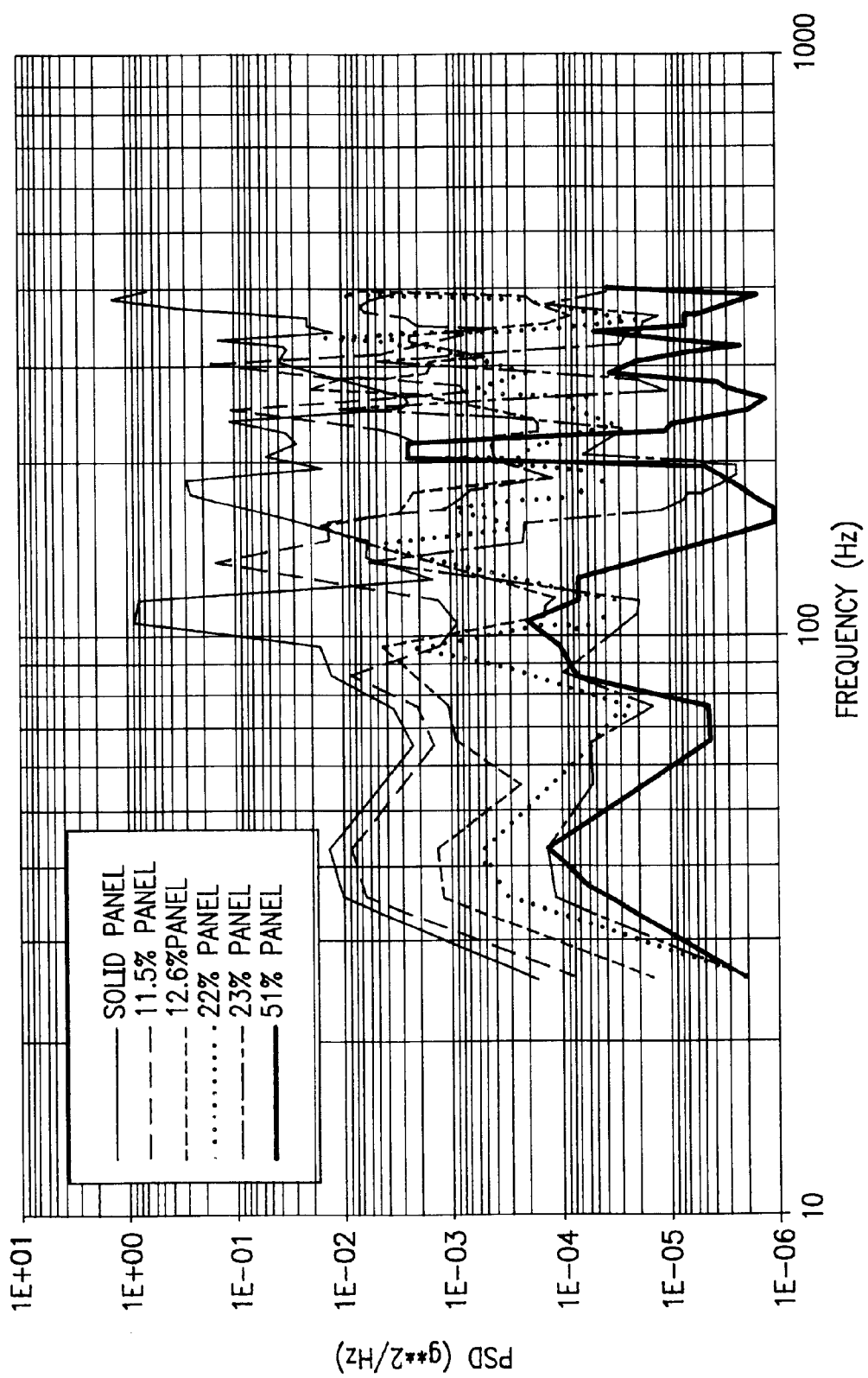
FIG. 5 shows the power spectral density (PSD) response of the low vibroacoustic structure versus sound frequency at 91 dB SPL input.
Figure 6:
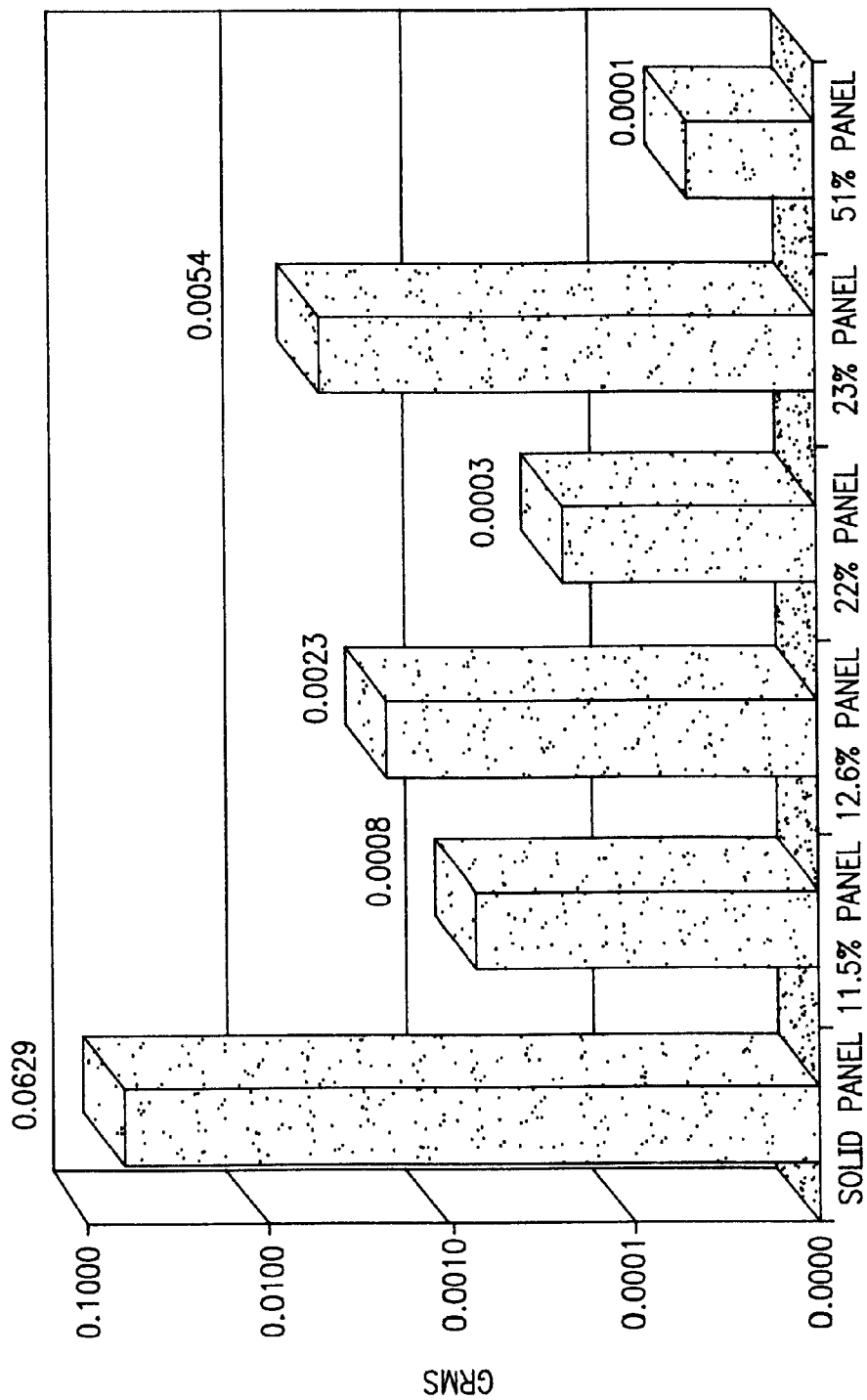
FIG. 6 shows the acceleration response of the low vibroacoustic structure to 66 dB sound pressure level (SPL) input.
Figure 7:
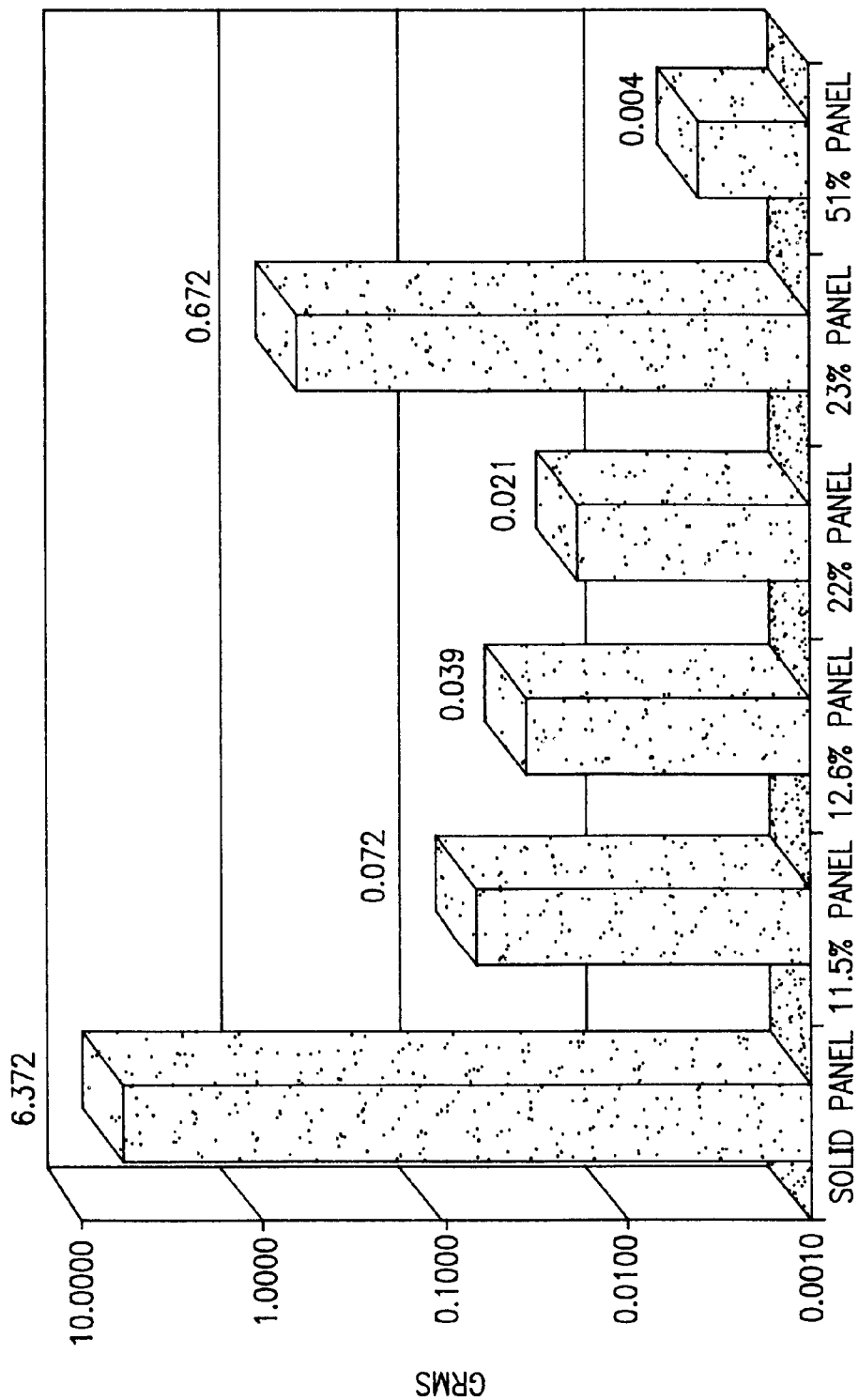
FIG. 7 shows the acceleration response of the low vibroacoustic structure to 86 dB SPL input.
Figure 8:
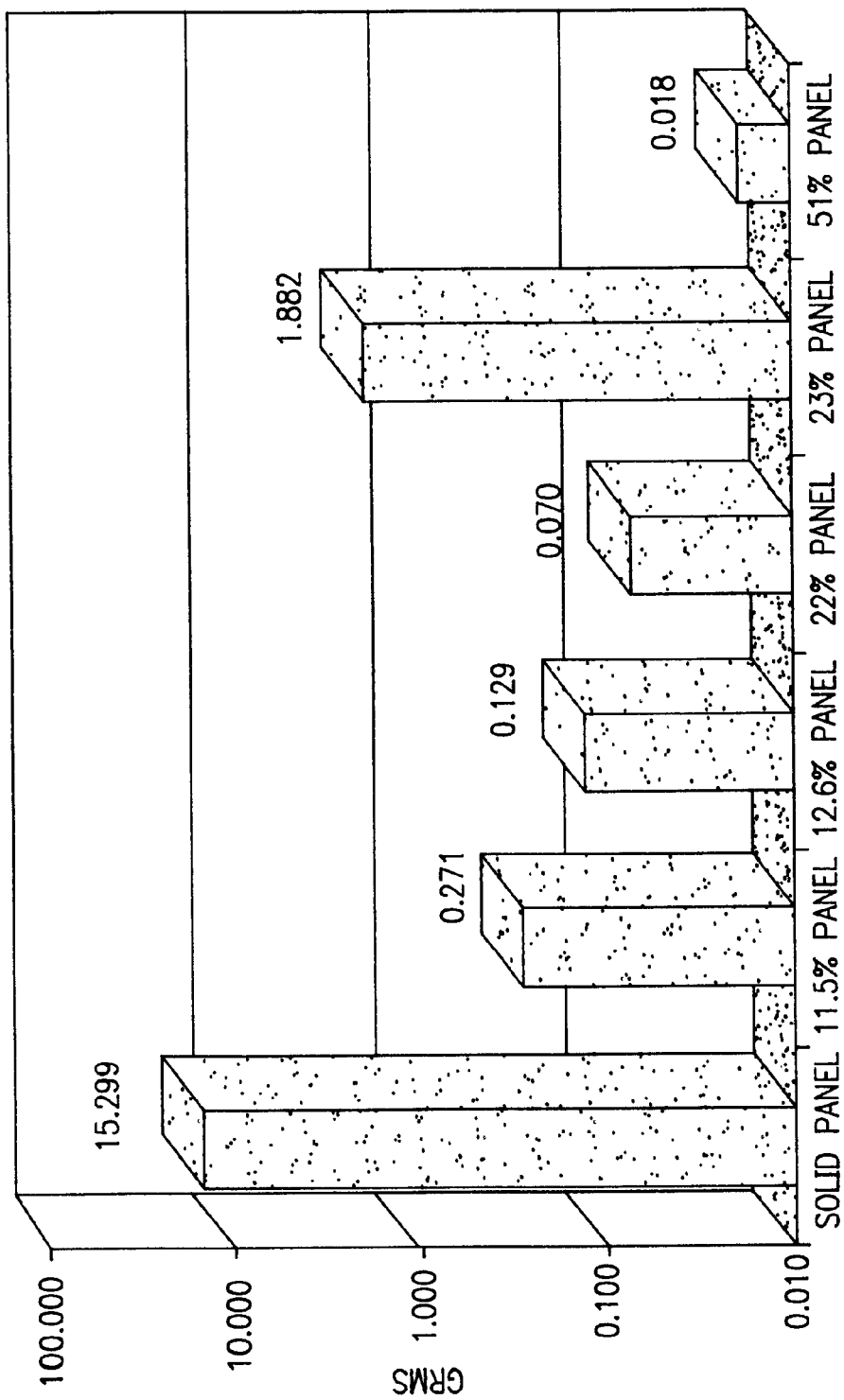
FIG. 8 shows the acceleration response of the low vibroacoustic structure to 91 dB SPL input.

Root-mean-square (Grms) acceleration levels were calculated from the PSD responses of the panels. The Grms acceleration levels at 66 SPL, 86 dB SPL and 91 dB SPL, respectively, are shown graphically in FIGS. 6–8, and are given in TABLE 2 below. The Grms level is related to the area under the PSD response curve such as shown in FIG. 5 and represents the total amount of energy absorbed by the panel during testing.

TABLE 2

| PANEL ACCELERATION RESPONSE (Grms) | | | |
|---|---|---|---|
| Panel | 91 dB SPL | 86 dB SPL | 66 dB SPL |
| 1 | 15.30 | 6.372 | 0.0629 |
| 2 | 0.27 | 0.072 | 0.0008 |
| 3 | 0.07 | 0.021 | 0.0003 |
| 4 | 0.02 | 0.004 | 0.0001 |
| 5 | 0.13 | 0.039 | 0.0023 |
| 6 | 1.88 | 0.672 | 0.0054 |

The Grms results indicate that each panel that included perforated facesheets (panels 2–6) exhibited reduced energy absorption and vibration levels as compared to the non-perforated facesheet panel (panel 1), over the sound pressure and frequency ranges tested. Comparing panels 4 and 5, increasing the hole spacing from 0.25 in. to 0.5 in. at the same hole diameter increased the panel response at 91 dB SPL, 86 dB SPL and 66 dB SPL also, indicating greater acoustic-structural coupling between the acoustic energy and the panel in panel 5. The test results show that for panels 2–4 each having the same hole spacing, but different hole diameters, the ratio of the hole total cross-sectional area to the panel facesheet facial area significantly influenced the panel energy absorption. Particularly, as this ratio increased from 11.5% to 51%, Grms decreased significantly. This result indicates that the panel absorbs increased energy as the holes cover a decreasing amount of the panel facial area. As a consequence of absorbing greater acoustic energy, the panel also has increased acoustically-induced vibration. The relative responses of panels 5 and 6 were closer at 66 dB than at 86 dB and 91 dB, possibly due to different amounts of energy in the combined acoustic modes and panel modes. Also, the passages in panel 5 were not as well aligned as in panel 6.

Hole diameter alone did not have an apparent strong influence on the panel response. Hole diameter was only significant when holes with large spacing did not align through the core from one side of the panel to the other (i.e., the misalignment between the holes of the facesheets and the passages of the core resulted in non-continuous channels through the thickness of the entire panel).

The hole spacing also influenced the level of reflected sound from each panel. This was evidenced by slightly higher average SPL microphone readings for panels having large hole spacings (panels 5 and 6) or no holes (panel 1) and conversely, lower microphone measurements of reflected sound from panels with higher hole density (panels 2–4). The speaker was driven with identical input power levels for each panel.

The test results indicate that it is important that the channels extending between the opposed faces of the panel are continuous to enable acoustic energy to travel through the panel. This is especially important for small cell diameter core with respect to the hole size and spacing of the facesheets. Misalignment of the holes in the facesheets and the passages in the core reduces pressure transmission through the panel and causes the panel to approach the sound absorption behavior of a panel having non-perforated facesheets. Alignment of the two facesheets is less significant for facesheets having holes that are much smaller in diameter and spacing than the core cell diameter.

Figure 9:
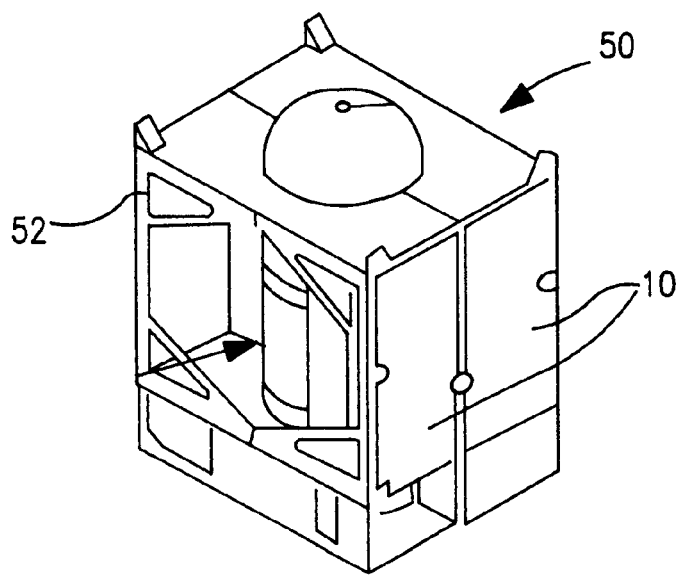
FIG. 9 shows the low vibroacoustic structure used as an equipment compartment panel in a spacecraft bus.

Referring to FIG. 9, the panel 10 according to the present invention can be used, for example, in a spacecraft bus 50. As shown, the bus 50 comprises a frame 52 to which the panels 10 are attached. The panels 10 can be equipment compartment panels. Alternatively, the panels 10 can form the frame of the spacecraft bus 50. The payload is typically mounted to the interior face (not shown) of the panels. During spacecraft launch with the present invention, sound pressure is transmitted through the panels 10, thus reducing acoustically induced vibration of the electronic equipment and also the spacecraft bus. As a result, the possibility of damage to sensitive payload components such as the electronic equipment caused by vibration is significantly reduced as compared to known panels having non-perforated facesheets.

Figure 10A:
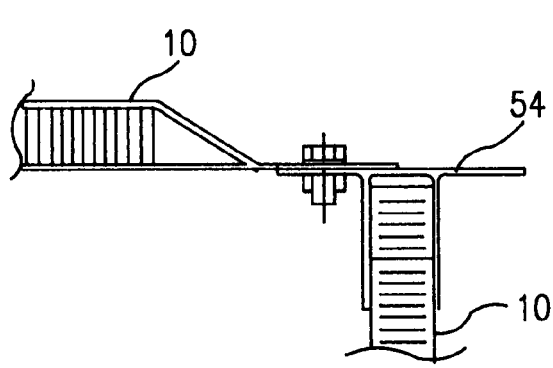
FIGS. 10A and 10B illustrate different mounting bracket configurations for mounting the low vibroacoustic structure to a support structure.
Figure 10B:
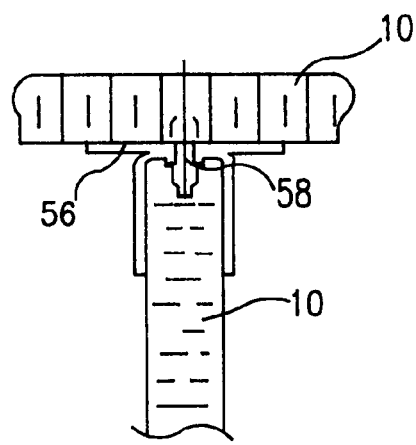

Referring to FIGS. 10A and 10B, the panels 10 can be mounted to a supporting structure using various mounting bracket configurations. For example, as shown in FIG. 10A, the opposed facesheets 12, 16 of the panel 10 can be adhered to the bracket 54. As shown in FIG. 10B, the panel 10 can alternately be fastened around the perimeter to the bracket 56 using small fasteners and inserts 58 which extend through the panel. Electronic components can be attached to the panels 10 using fasteners sized to extend through the panels with small inserts bonded in the panels (not shown).

Determining the vibration environment due to vibroacoustics is one of the more complex tasks in spacecraft design. The present panel 10 provides such a major reduction in the vibroacoustic environment at about 20–500 Hz frequencies that it may not be necessary to specify or even test attached sensitive electronic equipment. Although spacecraft electronic assemblies are typically exposed to vibration testing to screen manufacturing flaws, rigorous high level testing to establish survivability may not be needed. Thus, the present invention can decrease costly testing expenses.

It is envisioned that the panel 10 can be used in various other structures that are adversely affected by acoustic excitation. The panel structure is particularly advantageous for use in structures that have appreciable surface area and are lightly loaded, such as antenna reflectors, and can benefit significantly from reduced structural response to acoustic excitation.

Although the present invention has been described in considerable detail with reference to certain preferred versions thereof, other versions are possible. Therefore, the scope of the appended claims should not be limited to the description of the preferred versions contained herein.

What is claimed is:

1. A low vibroacoustic structure, comprising:
   (a) a core including a first surface, a second surface opposite the first surface, and a honeycomb structure disposed between the first and second surfaces, said honeycomb structure forming a series of passages through the core and extending through the first and second surfaces;
   (b) a first facesheet having a predetermined facial area on the first surface of the core, the first facesheet defining a plurality of first holes therethrough; and
   (c) a second facesheet having a predetermined facial area on the second facesheet defining a plurality of second holes therethrough,
   the first and second holes being in substantially aligned communication with the passages extending through the core, thereby forming a plurality of continuous channels through the structure, wherein the ratio of the cross-sectional area of the plurality of the first holes and the second holes, respectively, to the predetermined facial area of the first facesheet and the second facesheet, respectively, is in the range of 11.5% to 51%, so as to reduce acoustically induced vibration of the structure over the sound frequency range of from about 20 Hz to about 500 Hz.

2. The structure of claim 1, wherein the first and the second facesheets are comprised of a polymer matrix fiber reinforced composite material.

3. The structure of claim 1, wherein the first facesheet includes a pair of opposed first faces and the second facesheet includes a pair of opposed second faces, the ratio of the total cross-sectional area of the first holes and the second holes, respectively, to the area of each of the first faces and each of the second faces, respectively, is less than about 0.5.

4. A low vibroacoustic panel, comprising:
   (a) a core including a first surface, a second surface opposite the first surface, and a honeycomb structure disposed between the first and second surfaces, said honeycomb structure forming a series of passages through the core and extending through the first and second surfaces;
   (b) a first facesheet on the first surface of the core having a predetermined facial area on the first facesheet being comprised of a polymer matrix fiver reinforced composite material and defining a plurality of first holes therethrough,
   (c) a second facesheet on the second surface of the core having a predetermined facial area on the second facesheet being comprised of a polymer matrix fiber reinforced composite material and defining a plurality of second holes therethrough, the first and second holes being in substantially aligned communication with the passages extending through the core, thereby forming a plurality of continuous channels through the panel wherein the ratio of the plurality of the first holes and the second holes, respectively, to the predetermined facial area of the first facesheet and the second facesheet, respectively, in the range of less than 51%, so as to reduce acoustically induced vibration of the panel.

5. The panel of claim 4, wherein the first and second holes have (i) a diameter of from about 0.001 in. to about 0.2 in., and (ii) an on-center spacing of from about 0.007 in. to about 0.5 in.

6. The panel of claim 4, wherein the first and second facesheets each have a thickness of from about 0.025 in. to about 0.125 in.

7. The panel of claim 4, wherein the core comprises aluminum honeycomb sheet and the first and second sheets are comprised of epoxy graphite composite.

8. A low vibroacoustic panel, comprising:
   (a) a first facesheet including a first inlet face, a first outlet face, and a plurality of first holes extending through the first facesheet between the first inlet face and the first outlet face, the first facesheet being formed of a polymer matrix fiber reinforced composite material;

(b) a honeycomb sheet including a plurality of cells each having an inlet end in abutting contact with the first outlet face and an outlet end, the cells each defining a passage through the honeycomb sheet; and (c) a second facesheet including a second inlet face in abutting contact with the outlet end of the cells, a second outlet face, and a plurality of second holes extending through the second facesheet between the second inlet face and the second outlet face, the second facesheet being formed of a polymer matrix fiber reinforced composite material;

wherein, the ratio of the total cross-sectional area of the first holes and the second holes, respectively, to the area of the first inlet face and the second inlet face, respectively, is less than about 0.5 and the first and second holes are in substantially aligned communication with the passages, thereby forming a plurality of continuous channels through the panel, the channels reducing acoustically induced vibration of the panel over the sound frequency range of from about 20 Hz to about 500 Hz.

9. The panel of claim 8, wherein the first and second holes have (i) a diameter of from about 0.001 in. to about 0.2 in., and (ii) an on-center spacing of from about 0.007 in. to about 0.5 in.

10. The panel of claim 8, wherein the first and second facesheets each have a thickness of from about 0.025 in. to about 0.125 in.

11. The panel of claim 8, wherein the honeycomb sheet is comprised of aluminum and the first and second facesheets are comprised of graphite fiber reinforced plastic composite.

12. A spacecraft bus assembly, comprising:

a low vibroacoustic structure, comprising:

(a) a core including a first surface, a second surface opposite the first surface, and a plurality of passages extending through the core between the first surface and the second surface;

(b) a first facesheet having a predetermined facial area on the first surface of the core, the first facesheet defining a plurality of first holes therethrough; and (c) a second facesheet having a predetermined facial area on the second surface of the core, the second facesheet defining a plurality of second holes therethrough;

wherein, the first and second holes being in substantially aligned communication with the passages, thereby forming a plurality of continuous channels through the panel wherein the ratio of the plurality of the first holes and the second holes, respectively, to the predetermined facial area of the first facesheet and the second facesheet, respectively, is in the range of less than 51%, so as to reduce acoustically induced vibration of the spacecraft bus over the sound frequency range of from about 20 Hz to about 500 Hz.

13. The spacecraft bus assembly of claim 12, wherein the first and second facesheets are comprised of a polymer matrix fiber reinforced composite material.

14. The spacecraft bus assembly of claim 12, wherein the first and second facesheets are comprised of a fiber reinforced plastic composite material and the core is comprised of a honeycomb sheet.

15. The spacecraft bus assembly of claim 14, wherein the first and second holes have (i) a diameter of from about 0.001 in. to about 0.2 in., and (ii) an on-center spacing of from about 0.187 in. to about 0.5 in.

16. The spacecraft bus assembly of claim 12, wherein the low vibroacoustic structure comprises at least one equipment compartment panel.

17. The spacecraft bus assembly of claim 12, wherein the low vibroacoustic structure comprises the frame of the spacecraft bus.

18. A method of reducing acoustically induced vibration of a spacecraft bus during launch, the method comprising:

forming at least a portion of the spacecraft bus from at least one low vibroacoustic panel, each panel comprising:

(a) a core including a first surface, a second surface opposite the first surface, and a plurality of passages extending through the core between the first surface and the second surface;

(b) a first facesheet having a predetermined facial area on the first surface of the core, the first facesheet defining a plurality of first holes therethrough; and (c) a second facesheet having a predetermined facial area on the second surface of the core, the second facesheet defining a plurality of second holes therethrough, the first and second holes being in substantially aligned communication with the passages extending through the core, forming a plurality of continuous channels through the panel wherein the ratio of the plurality of the first holes and the second holes, respectively, to the predetermined facial area of the first facesheet and the second facesheet, respectively, is in the range of 11.5% to 51%, the channels reducing acoustically induced vibration of the spacecraft bus during launch over the sound frequency range of from about 20 Hz to about 500 Hz.

19. The method of claim 18, further comprising the step of mounting at least one electronic component to the panel.

20. The method of claim 18 wherein the spacecraft bus comprises a frame and the step of forming comprises attaching a plurality of the low vibroacoustic panels to the frame.

21. The method of claim 18, wherein the first and second facesheets are comprised of a polymer matrix fiber reinforced composite material and the core is comprised of a honeycomb sheet.

22. The method of claim 18, wherein the first and second holes have (i) a diameter of from about 0.001 in. to about 0.2 in., and (ii) an on-center spacing of from about 0.007 in. to about 0.5 in.

23. The method of claim 18, wherein the first facesheet includes a pair of opposed first faces and the second facesheet includes a pair of opposed second faces, the ratio of the total cross-sectional area of the first holes and the second holes, respectively, to the area of each of the first faces and each of the second faces, respectively, is less than about 0.5.

24. A method of reducing acoustically induced vibration of a structure subjected to an acoustic environment, the method comprising:

(a) providing a structure; and (b) attaching at least one low vibroacoustic panel to the structure, each panel comprising:

(i) a core including a first surface, a second surface opposite the first surface, and a plurality of passages extending through the core between the first surface and the second surface;

(ii) a first facesheet having a predetermined facial area on the first surface of the core, the first facesheet defining a plurality of first holes therethrough; and (iii) a second facesheet having a predetermined facial area on the second surface of the core, the second facesheet defining a plurality of second holes therethrough;

the first and second holes being in substantially aligned communication with the passages, thereby forming a plurality of continuous flow channels through the panel wherein the ratio of the plurality of the first holes and the second holes, respectively, to the predetermined facial rea of the first facesheet and the second facesheet, respectively, is in the range of less than 51%, so as to reduce acoustically induced vibration of the structure when subjected to the acoustic environment.

25. The method of claim 24, wherein the structure comprises a spacecraft bus of a spacecraft and the panel reduces acoustically induced vibration of the spacecraft bus during launch of the spacecraft.

* * * * *